United States Patent
Hansen et al.

(10) Patent No.: US 11,725,634 B2
(45) Date of Patent: Aug. 15, 2023

(54) WIND TURBINE TOWER TRANSITION PIECE

(71) Applicant: Vestas Wind Systems A/S, Aarhus N. (DK)

(72) Inventors: Thor Thiim Hansen, Aarhus (DK); Christian Fuglsbjerg, Galten (DK); Slawomir Michaluk, Aarhus C. (DK); Jeppe Søe, Rønde (DK)

(73) Assignee: Vestas Wind Systems A/S, Aarhus N (DK)

( * ) Notice: Subject to any disclaimer, the term of this patent is extended or adjusted under 35 U.S.C. 154(b) by 313 days.

(21) Appl. No.: 17/298,757

(22) PCT Filed: Dec. 5, 2019

(86) PCT No.: PCT/EP2019/083767
§ 371 (c)(1),
(2) Date: Jun. 1, 2021

(87) PCT Pub. No.: WO2020/115180
PCT Pub. Date: Jun. 11, 2020

(65) Prior Publication Data
US 2022/0025873 A1  Jan. 27, 2022

(30) Foreign Application Priority Data
Dec. 5, 2018 (EP) .................... 18210397

(51) Int. Cl.
*F03D 80/80* (2016.01)
*F03D 13/25* (2016.01)
(Continued)

(52) U.S. Cl.
CPC ............. *F03D 80/85* (2016.05); *F03D 13/10* (2016.05); *F03D 13/25* (2016.05); *F03D 9/257* (2017.02);
(Continued)

(58) Field of Classification Search
CPC .......... F03D 9/257; F03D 13/10; F03D 13/25; F03D 80/85
See application file for complete search history.

(56) References Cited

U.S. PATENT DOCUMENTS

| | | | |
|---|---|---|---|
| 3,222,664 A | 12/1965 | Premack | |
| 2011/0074155 A1* | 3/2011 | Scholte-Wassink | .... B63B 35/44 290/55 |

(Continued)

FOREIGN PATENT DOCUMENTS

| | | |
|---|---|---|
| CN | 1633558 A | 6/2005 |
| CN | 101463798 A | 6/2009 |

(Continued)

OTHER PUBLICATIONS

European Patent Office, European Search Report in EP Application No. 18210397.8, dated May 23, 2019.
(Continued)

*Primary Examiner* — Tulsidas C Patel
*Assistant Examiner* — Thomas K Quigley
(74) *Attorney, Agent, or Firm* — Wood Herron & Evans LLP

(57) ABSTRACT

A transition piece (140) for a wind turbine tower (110) is provided, that is configured to be installed on a tower foundation (111) and to carry a tower piece (113). It comprises a high voltage joint (10) with grid input and output terminals (11, 12) and WTG connecting input and output terminals (14, 13). The grid input terminal (11) is configured for receiving and connecting to an array cable (21) from a power grid (20). The WTG connecting output terminal (13) is operatively connected to the grid input terminal (11) for receiving and connecting to an input cable (23) leading to a switchgear (30). The WTG connecting input terminal (14) is configured for receiving and connecting to an output cable (24) from the switchgear (30). The grid output terminal (12)

(Continued)

is operatively connected to the WTG connecting input terminal (14) for receiving and connecting to an array cable (22) leading to the power grid (20). Further, installation, testing, connecting and maintenance methods taking advantage of the high voltage joint (10) are provided.

26 Claims, 12 Drawing Sheets

(51) Int. Cl.
  *F03D 13/10* (2016.01)
  *F03D 9/25* (2016.01)
(52) U.S. Cl.
  CPC ....... *F05B 2230/60* (2013.01); *F05B 2240/85* (2020.08)

(56) References Cited

U.S. PATENT DOCUMENTS

| | | | | |
|---|---|---|---|---|
| 2011/0211951 A1* | 9/2011 | Kooijman | ................ | F03D 7/04 416/31 |
| 2012/0326447 A1* | 12/2012 | Rodway | ................ | F03D 9/255 290/55 |
| 2015/0108764 A1* | 4/2015 | Moeller | ................ | F03D 80/00 290/55 |
| 2015/0152850 A1 | 6/2015 | Nielsen | | |
| 2015/0198148 A1* | 7/2015 | Mello | ................ | E02B 17/02 52/745.16 |
| 2018/0282134 A1* | 10/2018 | Lagerweij | ............ | B66C 23/207 |
| 2019/0040844 A1* | 2/2019 | Da Silva | ................ | F03D 13/25 |
| 2019/0097426 A1* | 3/2019 | Peron | ................ | F03D 17/00 |

FOREIGN PATENT DOCUMENTS

| | | |
|---|---|---|
| CN | 102904274 A | 1/2013 |
| CN | 102933844 A | 2/2013 |
| CN | 207625694 U | 7/2018 |
| EP | 2631479 A2 | 8/2013 |
| EP | 2871357 A1 | 5/2015 |
| WO | 2018046205 A1 | 3/2018 |

OTHER PUBLICATIONS

European Patent Office, International Search Report and Written Opinion in PCT Application No. PCT/EP2019/083767, dated Feb. 5, 2020.

China National Intellectual Property Administration, Office Action issued in corresponding Chinese Patent Application No. 201980090743.3, dated Apr. 13, 2023 with English translation.

* cited by examiner

WIND TURBINE TOWER TRANSITION PIECE

FIELD OF THE INVENTION

The present invention relates to a transition piece for a wind turbine tower, the transition piece being configured to be installed on a tower foundation and to carry a tower piece. The present invention further relates to a wind turbine tower, a wind turbine, a method of installing a wind turbine, a method of testing a power grid for connecting a plurality of wind turbines, and a method of connecting at least two wind turbines to the same power grid.

BACKGROUND OF THE INVENTION

The use of wind power for generating electricity has been significantly increasing over the last few decades. At the same time, wind turbines and their blades grew taller, thereby further increasing the power output per wind turbine. Many of the larger rotors are installed in offshore wind turbines parks, where they may endure higher wind speeds and are generally less intrusive to the view of the public. Depending on the depth of the water in which the wind turbine is installed, the wind turbine may either have an underwater fixed foundation or a floating structure that is moored to the seabed.

The installation of an offshore wind turbine is a complex logistical and constructional operation. Large parts of the wind turbine are built and tested onshore and then transported to the place where the wind turbine is to be installed. There, the larger parts are installed and commissioned. Large, expensive and sensitive equipment is either pre-installed in the nacelle or tower sections before transportation to the offshore location or installed later when the respective wind turbine sections are already in place.

A commonly used approach for installing an offshore wind turbine generator (also WTG) is to first install a tower foundation on the seabed and to provide a transition piece thereon. The transition piece comprises a platform that provides access to a boat that transports engineers, equipment and tools to and from the wind turbine. A crane may be installed for lifting heavy equipment and tools that need to be moved around during installation and maintenance operations. A cylindrical support section is usually provided for supporting a tower piece that is installed at a later stage. This support section may itself form a first tower level or tower base section rising above the platform, on which further tower sections are to be installed. Alternatively, the support section is substantially level with the platform. The tower piece carries the nacelle with the rotor and may consist of multiple tower sections that are put on top of each other.

Wind turbines comprise a lot of equipment for converting the wind energy into electricity that can be fed to the power grid. A powertrain for doing the first conversion from kinetic energy at the rotor to electric energy, for example comprises a main bearing, a gearbox and a generator that are all provided in the nacelle on top of the tower piece. Power electronics for coupling the generator output to the grid are usually provided in the tower. For example, a switchgear for connecting the wind turbine to incoming and outgoing array cables of the power grid is usually provided at the bottom level of the tower, which for an offshore tower is often at the transition piece. Other equipment that is usually placed in a transition portion base section of the tower after installation is a lift for transporting people and equipment between the transition piece platform level and the nacelle, or a central tower control unit that allows for on-site monitoring and control operations.

In an offshore wind farm, a plurality of wind turbines is usually connected to the power grid in series along a so-called string. In order to test the string's connection to the power grid and to start operating a wind turbine on the string, it is necessary to first connect all upstream wind turbines on the string. The tower foundation and transition piece are often built by an offshore construction company. During construction of the transition piece, some of the wind turbine equipment may already have to be installed in order to allow for efficient construction of the wind turbine and, possibly, to already permit some string testing. For example, if the switchgears are already installed during construction of the transition piece, i.e. before arrival of the tower and the nacelle, the array cables can be connected and tested before all wind turbines are fully installed. This approach, however, has the disadvantage that the expensive and sensitive switchgear equipment is present when heavy construction work is still ongoing and will be exposed to the offshore environment for a period of time. Also, when the switchgear is installed together with the transition piece, it will not be available for onshore testing and preparation of the wind turbine, before it is shipped to the location where it will be deployed.

It is an object of the present invention to provide a solution to at least some of the problems mentioned above and it is against this background that the present invention has been developed.

SUMMARY OF THE INVENTION

According to a first aspect of the invention this object is achieved by providing a transition piece for a wind turbine tower, the transition piece being configured to be installed on a tower foundation and to carry a tower piece. The transition piece comprises a high voltage joint having a grid input terminal, a WTG connecting input terminal, a grid output terminal and a WTG connecting output terminal. The grid input terminal is adapted to receive and connect to an array cable from the power grid. The WTG connecting output terminal is operatively connected to the grid input terminal and configured to receive and connect to an input cable leading to a switchgear. The WTG connecting input terminal is adapted to receive and connect to an output cable from the switchgear. The grid output terminal is operatively connected to the WTG connecting input terminal and configure to receive and connect to an array cable leading to the power grid.

In the context of the present application the term a high voltage joint comprises at least one input terminal and at least one output terminal and a direct uninterruptable electrical connection between the input and output terminals. Therefore, a high voltage joint as described herein comprises no internal switches, disconnectors or disconnect switches in the direct electrical connection between said at least one input terminal and said at least one output terminal. Particularly, traditional switch gears are not considered high voltage joints in the context of the present invention.

With the high voltage joint according to the invention installed in the transition piece, it becomes possible to already connect the incoming and outgoing array cables before the tower piece and the switchgear have arrived or have been installed. A simple jumper connecting the WTG connecting output terminal to the WTG connecting input terminal can connect the two array cables, thereby enabling string testing and even commissioning or full operation of other wind turbines on the same string. When the full wind turbine is later installed on top of the transition piece, the jumper can be removed and the WTG connecting output and input terminals of the high voltage joint can then be connected to respective input and output terminals of the switchgear in order to connect the wind turbine to the power grid. The jumper may already be connected to the two WTG connecting terminals before the array cables are connected, possibly already during manufacturing of the high voltage joint. Alternatively, the jumper is installed when the array cables are already connected. For example, when during the lifetime of the wind turbine, the WTG is to be disconnected for maintenance or repair, the jumper may be (re-)installed to allow the power grid to remain operative during the maintenance or repair operation.

The provision of this high voltage joint obviates the need for installation of the full switchgear in the tower supporting section of the transition piece, while maintaining the possibility to integrate the transition piece into a larger power grid already before the complete wind turbine tower is installed.

A further advantage of this approach is that the switchgear and other bulky and sensitive electronic equipment can be installed in a section of the tower piece that is only provided later. This allows for a full wind turbine installation and test procedure to be performed onshore, just before the tower and the nacelle are shipped to their offshore location. Furthermore, with less equipment installed directly at the transition piece itself, free space is generated that may, e.g., be used for installing a stairway leading to the first level of the later installed tower piece. In the context of this invention 'tower piece' is to be interpreted as the portion of the wind turbine tower that is installed on top of the transition piece. This tower piece may consist of multiple sections that can be assembled onshore before transporting the whole tower piece to its offshore location. Alternatively, the tower piece is partly assembled during installation on top of the transition piece. A nacelle with a rotor and a power train (main bearing, optional gearbox, generator) are placed on the tower piece.

Optionally, the transition piece further comprises a platform with a tower piece support section, the tower piece support section comprising a wall with a doorway connecting an inside of the tower piece support section with an outside of the tower piece support section, the high voltage joint being provided inside the tower piece support section. Preferably, the high voltage joint is installed at relatively high location, close to the top of the support section wall, such that it will be close to the switchgear that arrives together with the tower piece. When the high voltage joint is installed closer to the platform level, longer output and input cables are needed for connecting the high voltage joint to the switchgear.

When the tower piece support section does have a doorway allowing people to go through, the inner portion of the tower piece support section may comprise a stairway for allowing climbing from a platform level to a first level of the tower piece. With this doorway and stairway present in the tower piece support section, there is no need for providing a doorway in the tower piece itself, which will improve its structural integrity. This is especially advantageous since the tower piece can be produced onshore and therefore must be transported over land and water, during which transport it must be handled with care to avoid damage to its construction. It is to be noted that, in the context of this invention, 'stairway' is to be interpreted as to not include ladders that require a user to use hands and feet to climb upstairs, but as a stepped structure that allows a user to walk up the steps with tools or equipment in at least one of their hands.

Furthermore, when providing this stairway for reaching the first level of the tower piece, a lift system can be installed that does not go down all the way to the platform level of the transition portion. Consequently, the complete lift system can be installed and tested on shore and no preparation for a lift system has to be provided at the transition piece. This again frees up space at the transition portion and avoids the early installation of expensive and/or breakable lift equipment before the construction of the transition piece has been completed.

In different embodiments, the tower piece support section is not high enough to embody a full tower level and walls with a doorway. The tower piece support section may, e.g., just be a dedicated area on the platform or a low support structure that only comprises the high voltage joint. The tower piece support section may even be a groove in the platform surface for receiving the tower piece to be installed thereon.

According to a further aspect of the invention, a wind turbine tower is provided comprising a tower foundation, a transition piece as described above, and a tower piece. The transition piece is provided on the tower foundation and the tower piece is installed on top of the transition piece. The tower piece may comprise one or more lower sections with electronic equipment for electrically connecting a wind turbine generator to a power grid, such as a transformer, a switchgear and a tower controller.

At least one of the lower sections may comprise a bottom part of a lift system. When access to the wind turbine tower is possible from the transition piece level, the outer walls of the lower sections comprising the bottom part of the lift system may have an outer wall that is free of doorways.

According to yet another aspect of the invention, a method of installing a wind turbine is provided. The method comprises installing a transition piece as described above on a tower foundation. Then a first array cable from a power grid is connected to the grid input terminal of the high voltage joint, and a second array cable leading to the power grid is connected to the grid output terminal of the high voltage joint. Thereafter, a tower piece is installed on top of the transition piece. Later, an output cable is connected between the WTG connecting output terminal of the high voltage joint and a high voltage input terminal of a switchgear, and an input cable is connected between a high voltage output terminal of the switchgear and the WTG connecting input terminal of the high voltage joint.

Preferably, the switchgear is only provided together with the tower piece, i.e. after the construction of the transition piece has already been completed and the risk of damage of the switchgear is considerably reduced. The switchgear may be pre-installed in the tower piece and transported to the offshore location together therewith.

The method may further comprise energizing the first array cable after connecting of the output cable between the WTG connecting output terminal of the high voltage joint and the high voltage input terminal of the switchgear. When energizing the first array cable, even when the second array cable has not been energized yet, electric power can be used, for example, for operating the crane or the lift without needing a diesel generator.

Preferably, before connecting the output cable and the input cable between the high voltage joint and the switchgear, a jumper is applied to the WTG connecting output terminal and the WTG connecting input terminal of the high voltage joint for establishing an electrical connection therebetween. The jumper then remains attached during a subsequent phase of the installation process. During this subsequent phase, the power grid and its connections to (the high voltage joints of) the other wind turbines on the same string may be tested. With the jumper attached, it is also possible to start operating one or more already completed wind turbines in the same string before the tower piece has arrived at the transition piece or during construction and installation of the tower piece.

At the end of said subsequent phase, the jumper is removed from the high voltage joint and the output cable and the input cable are connected between the high voltage joint and the switchgear. When the switchgear is connected, the wind turbine can be commissioned and may start delivering power to the grid.

During at least some of the period before the high voltage joint is connected to the switchgear the WTG connecting output terminal and/or the WTG connecting input terminal of the high voltage joint may be covered by a protective cover. This may be useful for safety purposes as well as for protecting against damage. The cover may be applied to shield of the WTG connecting terminals when no jumper is connected or to protect the jumper and its connections to these terminals when it is connected.

According to yet another aspect of the invention, a method of testing a power grid for connecting a plurality of wind turbines is provided, wherein at least one of the wind turbines comprises a transition piece as described above. The method comprises connecting a first array cable from the power grid to the grid input terminal of the high voltage joint of said transition piece, connecting a second array cable, leading to the power grid, to the grid output terminal of the high voltage joint, applying a jumper to the WTG connecting output terminal and the WTG connecting input terminal of the high voltage joint and thereby establishing an electrical connection therebetween, and then testing the power grid. With this method, the power grid and all its connections to the wind turbines can already be tested when only the transition pieces and the high voltage joint have been installed.

The testing may involve attaching a test plug to the WTG connecting output terminal of the high voltage joint of the second one of the wind turbines. The same test can be performed when using a jumper to connect the WTG connecting output and input terminals and attaching the test plug to the grid output terminal of the high voltage joint.

According to a further aspect of the invention, also a method of connecting at least two wind turbines to the same power grid is provided. In addition to the at least two wind turbines, the power grid comprises at least one transition piece as described above. This transition piece thus is not part of any of the at least two wind turbines. The connection method comprises connecting a first array cable, from a first one of the at least two wind turbines, to the grid input terminal of the high voltage joint of said transition piece, and connecting a second array cable, leading to a second one of the at least two wind turbines, to the grid output terminal of the high voltage joint. Then, a jumper is applied to the WTG connecting output terminal and the WTG connecting input terminal of the high voltage joint to establish an electrical connection therebetween. Alternatively, the jumper may be applied before connecting the array cables.

Making use of the high voltage joint according to the invention, this method makes it possible to connect two or more wind turbines on the same string, even though there may be wind turbines positioned in between that are not yet connected. It does not matter if the not yet connected wind turbine is simply out for maintenance or if its tower piece, nacelle and rotor have not yet been installed. As long as a transition piece is constructed and contains the high voltage joint, two wind turbines at different sides of this transition piece can be connected via the high voltage joint. Of course, the two wind turbines can be connected in a similar way when separated by two or more interconnected transition pieces. When connected in this way, operation of the at least two wind turbines can be initiated after energizing the array cables.

When the wind turbine comprising the transition piece in the middle (the one with the high voltage joint connecting the at least two wind turbines) is also ready for starting operation, it can be connected in the following way. First the first array cable is de-energized, the jumper is removed from the WTG connecting output terminal and the WTG connecting input terminal of the high voltage joint. Then an output cable is connected between the WTG connecting output terminal of the high voltage joint and a high voltage input of a switchgear of the now to be connected wind turbine. Further, an input cable is connected between a high voltage output of the switchgear and the WTG connecting input terminal of the high voltage joint. Finally, the first array cable can be re-energized.

According to a further aspect of the invention, a maintenance method for at least one wind turbine in a network of multiple wind turbines is provided. The at least one wind turbine comprises a transition piece and high voltage joint as described above. The method comprises de-energizing the first array cable to the high voltage joint, disconnecting the output cable and the input cable from, respectively, the WTG connecting output terminal and the WTG connecting input terminal of the high voltage joint and applying a jumper to the WTG connecting output terminal and the WTG connecting input terminal and thereby establishing an electrical connection therebetween. In a next step, the first array cable is re-energized, thereby allowing the other wind turbines on the same string to resume operation.

With the switchgear of this specific wind turbine disconnected, it is possible to perform at least one maintenance operation at this wind turbine. The maintenance operation may, e.g., include a (partial) removal or replacement of the switchgear, a powertrain component, a nacelle and/or a tower piece. When the maintenance operation is completed, and the wind turbine is ready to be used again, the first array cable is de-energized, the jumper is removed, and the output and input cables are reconnected to the appropriate terminals of the switchgear and the high voltage joint. Then the first array cable is re-energized, and the wind turbine is ready for use again.

It will be appreciated that preferred and/or optional features of the first aspect of the invention may be combined with the other aspects of the invention. The invention in its various aspects is defined in the independent claims below and advantageous features are defined in the dependent claims below.

BRIEF DESCRIPTION OF THE DRAWINGS

For a better understanding of the invention, some embodiments of the invention will now be described with reference to the following drawings, in which.

DETAILED DESCRIPTION

Figure 1:
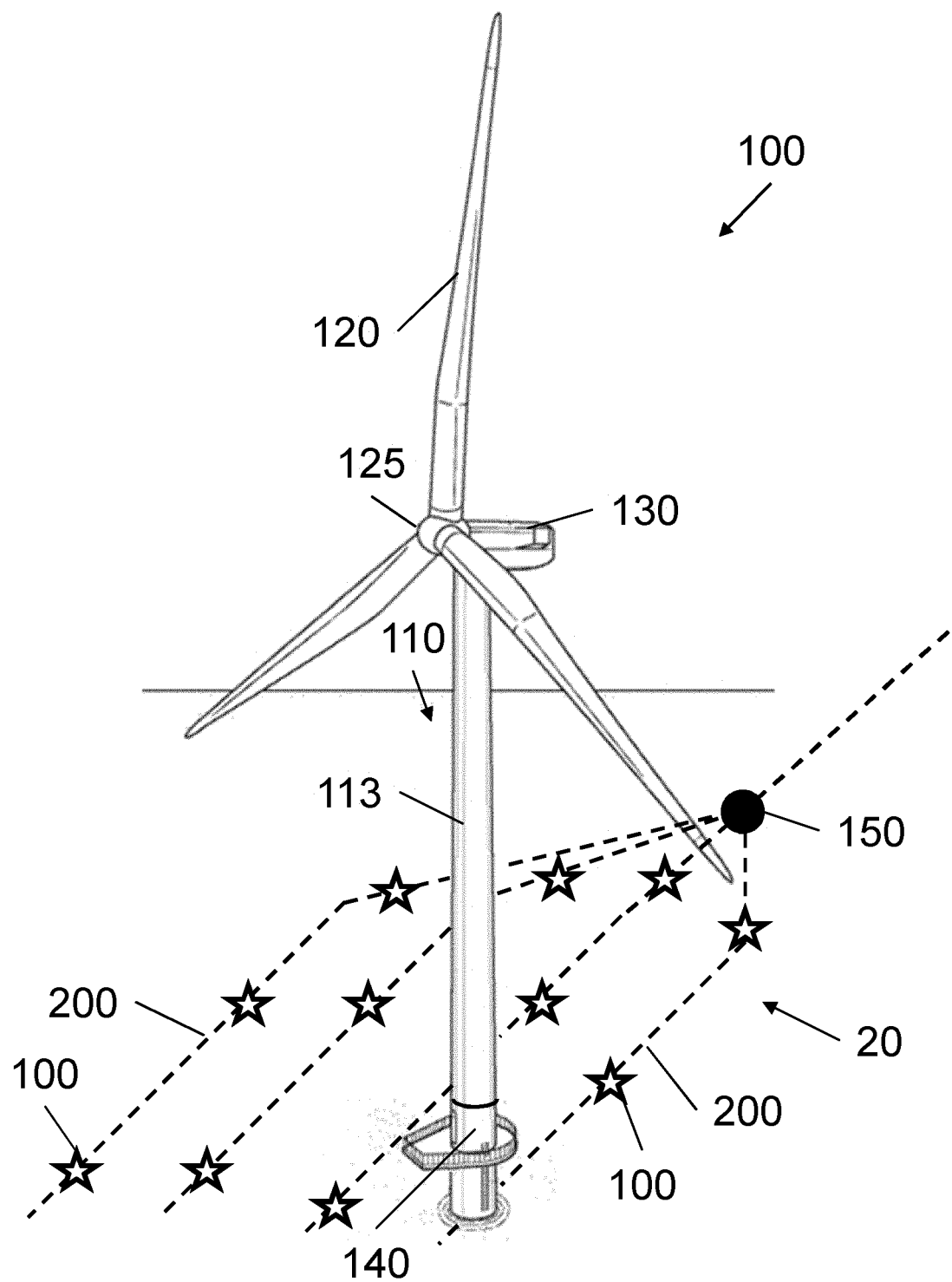
FIG. 1 shows a schematic representation of an offshore wind turbine in which the invention may be advantageously used.

FIG. 1 shows a schematic representation of an offshore wind turbine 100 in which the invention may be advantageously used. The wind turbine 100 is connected to a power grid 20 to which also other wind turbines (not shown) are connected. The wind turbine 100 comprises a foundation and a transition piece 140 that will be discussed in more detail below with reference to FIG. 2. On top of the transition piece 140, a tower piece 113 is installed. The foundation, the transition piece 140 and the tower piece 113 together form the wind turbine tower 110. On top of the tower piece 113, a nacelle 130 is provided. The nacelle 130 carries a rotor hub 125 with blades 120. The nacelle 130 comprises a powertrain comprising a main bearing for supporting the hub and the low speed shaft connected thereto. A gearbox may optionally convert the low speed rotation of the hub to a higher speed rotation that drives a generator. The generator converts the kinetic energy from the rotation of an output shaft into electric energy, optionally via the gearbox.

The generator output is generally not suitable for directly feeding into the power grid 20. Both the frequency and the amplitude of the alternating power from the generator vary with the wind speed and generally differ from the power grid requirements. Power electronics are therefore provided for controlling the frequency and voltage of the electric power that is fed into the grid 20. The power electronics may, e.g., comprise a rectifier for converting the highly variable AC generator output to a DC current. An inverter subsequently transforms the DC current into an AC current with the right grid frequency. A transformer is usually provided to increase the output voltage of the inverter to a high voltage AC grid voltage level. A switchgear is provided for coupling the high voltage AC output to an array cable leading to the power grid 20. Multiple wind turbines 100 are connected to the power grid 20 in series, along a so-called string 200 of array cables. Multiple strings 200 are connected to the onshore power grid via a central Offshore Sub Station (OSS) 150.

In a horizontal axis wind turbine 100 as shown in FIG. 1, the full powertrain including the generator is comprised in the nacelle. The power electronics are typically distributed over different sections of the wind turbine 100. While the first AC to DC conversion may already take place in the nacelle, the inverter and the switchgear are usually provided closer to ground level, where the connections to the power grid 20 are to be made. It is to be noted that the wind turbine 100 of FIG. 1 is just one example of a wind turbine 100 that may benefit from the invention, and that the invention is not limited to a specific type of wind turbine with a specific distribution of functional units over the different sections. For example, the invention may also be advantageously used in a vertical axis wind turbine and all power electronics may be provided in the nacelle, high up in the tower or at the tower bottom. Also, the WTG may have a geared or gearless drivetrain. It is, however, important for the invention that some type of switchgear is used for connecting the wind turbine 100 to a power grid 20 in a larger network of wind turbines.

Figure 2:
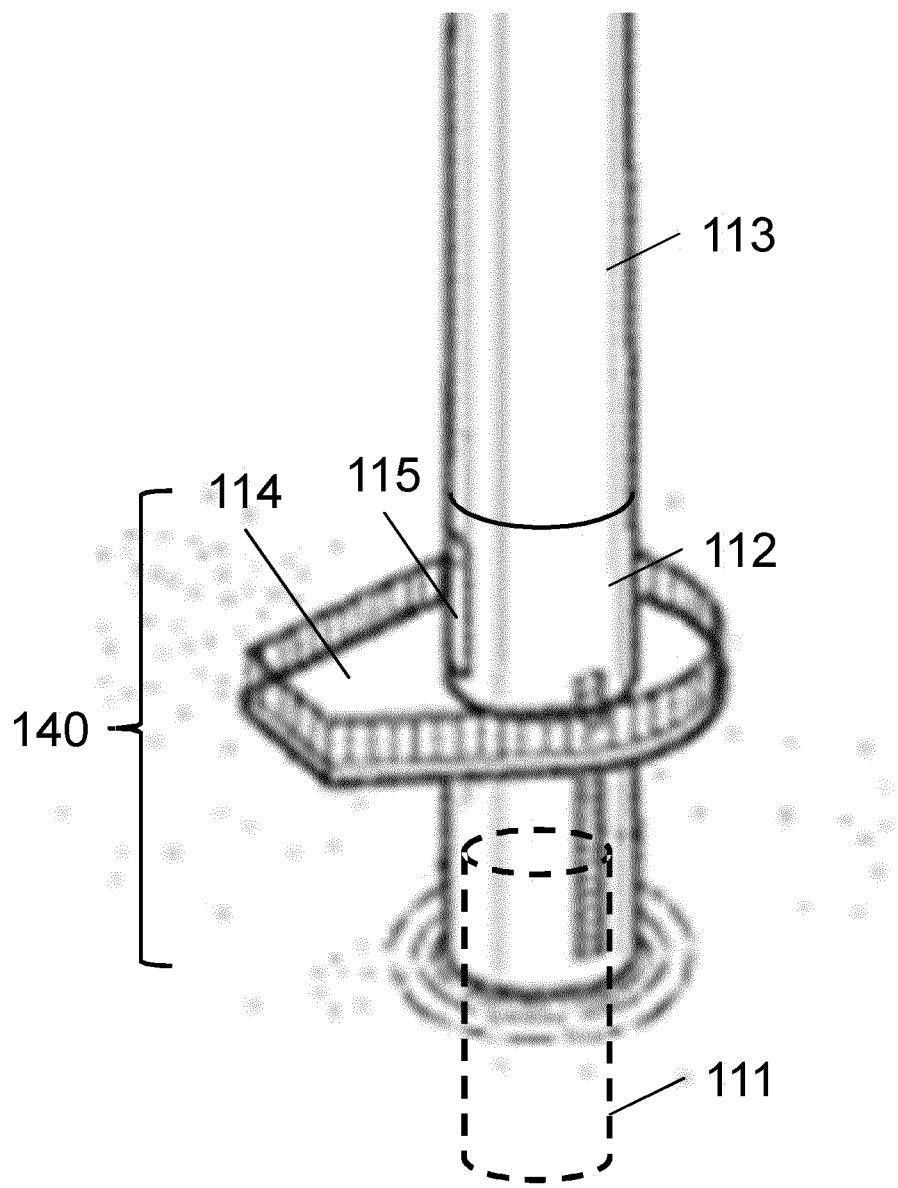
FIG. 2 shows a close-up of the lower portion of the offshore wind turbine of FIG. 1.

FIG. 2 shows a close-up of the lower portion of the offshore wind turbine 100 of FIG. 1. The wind turbine 100 is built on a foundation that is embedded in, supported on or moored to the seabed. In this exemplary embodiment, the foundation is a monopole 111. In deeper waters, tripod structures or jacket foundations may be used. Alternatively, a floating structure may be moored to the seabed. On top of the foundation 11, a transition piece 140 is installed. The transition piece 140 comprises one or more platforms 114 that provide access to a boat that transports people, equipment and tools to and from the wind turbine 100. A crane (not shown) may be installed for lifting heavy equipment and tools that need to be moved around during installation and maintenance operations. The transition piece 140 and/or the transition piece platform 114 are configured to support the tower piece 113. In this wind turbine 100, a cylindrical support section 12 is provided for supporting the tower piece 113. This support section 112 forms a first tower level or tower base section rising above the platform 114, on which further tower sections are installed. In alternative embodiments, the support section is substantially level with the platform 114. Preferably, a doorway with a door 115 is provided in a wall of the support section 112 to allow people to access the tower from the platform 114.

Figure 3:
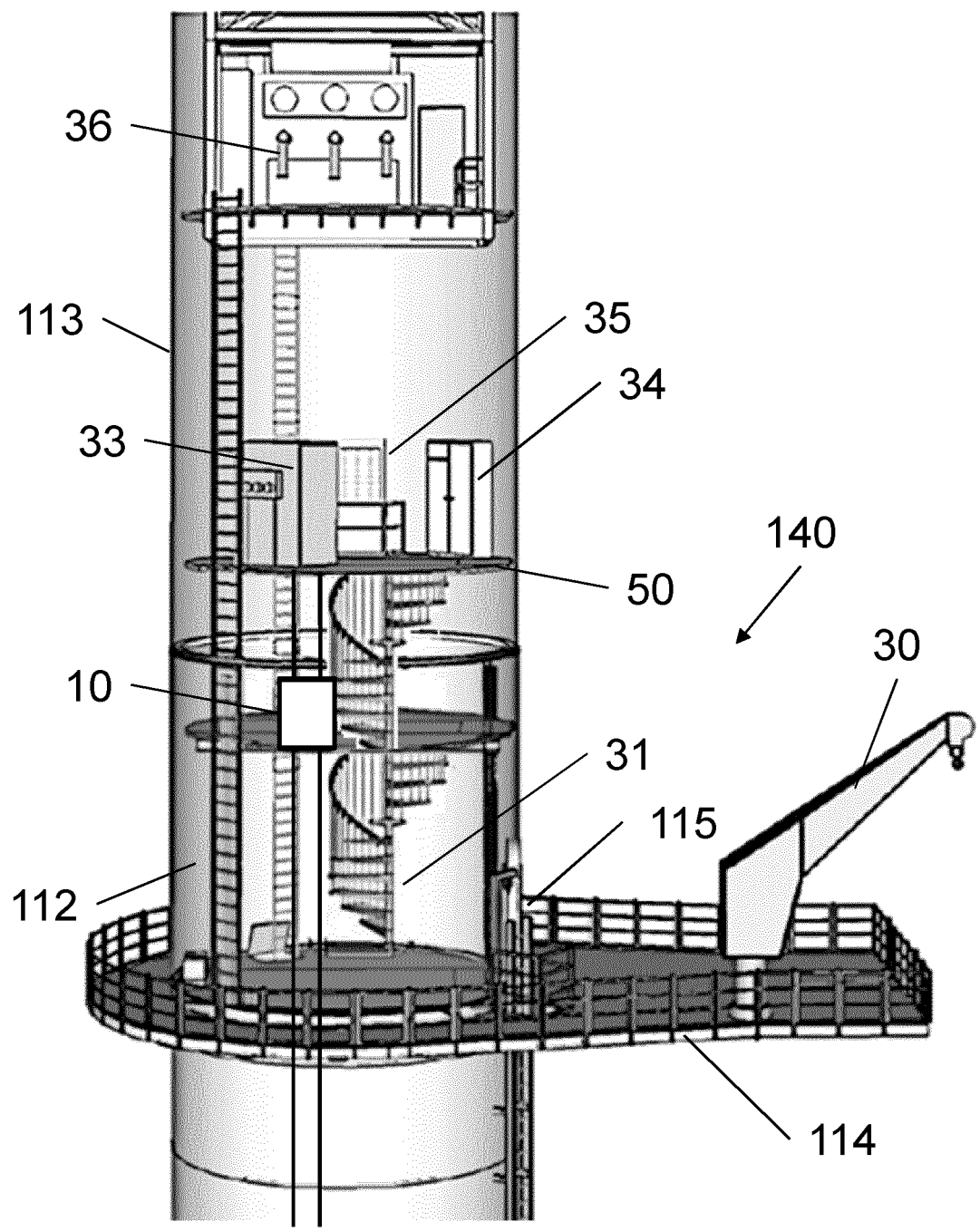
FIG. 3 schematically shows a cutaway drawing of the close-up of FIG. 2.

FIG. 3 schematically shows a cutaway drawing of the close-up of FIG. 2. In addition to what has already been shown in and described with reference to FIGS. 1 and 2, FIG. 3 further shows a crane 30 that can, e.g., be used for lifting items from and into nearby boats. A stairway 31 is provided in the support section 112 and leads at least from the level of the transition piece with the doorway to a first level 50 of the tower piece 113. A lift 35 is installed in the tower piece 113 for transporting people, tools and equipment to between a level that can be reached via the stairs 31 and a platform near the nacelle 30. The tower piece 113 may further comprise a central tower control unit 34, a switchgear 33 and further electronic equipment 36, such as for example (parts of) the power electronics for the AC-AC conversion of the electric power generated by the generator. According to the invention, as will be further explained below, the support section 112 of the transition piece comprises a high voltage joint 10 that is preferably positioned such that, after installation of the tower piece 113 and all the equipment provided therein, the high voltage joint 10 is located close to the switchgear 33 or at least at a location from where it is relatively easy to connect cables between the two.

Figure 4:
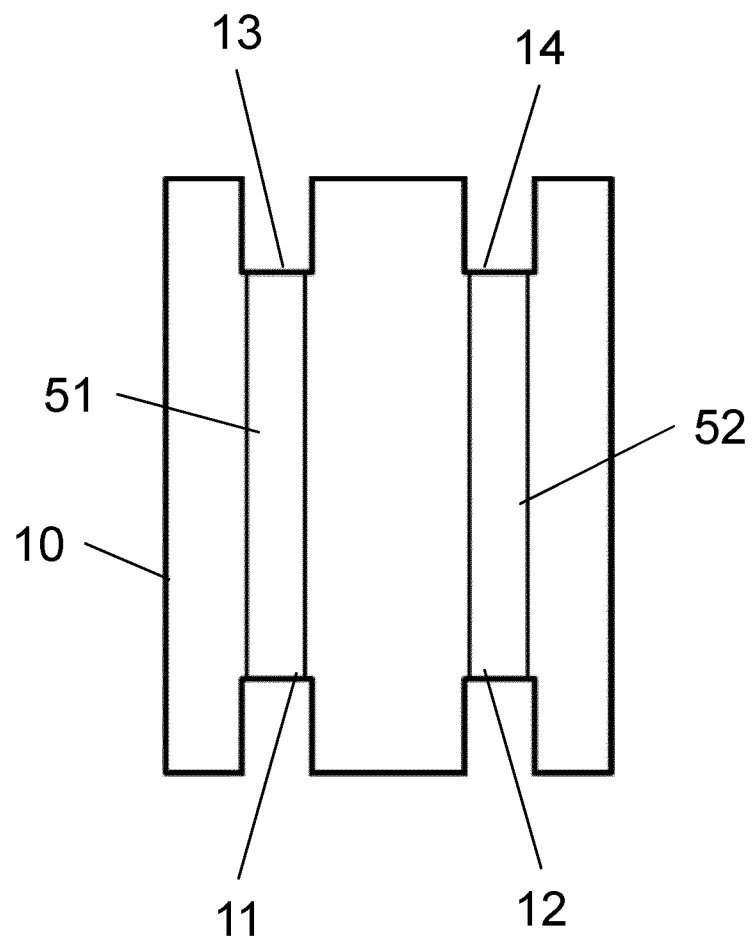
FIG. 4 schematically shows an example of a high voltage joint as used with the current invention.
Figure 5:
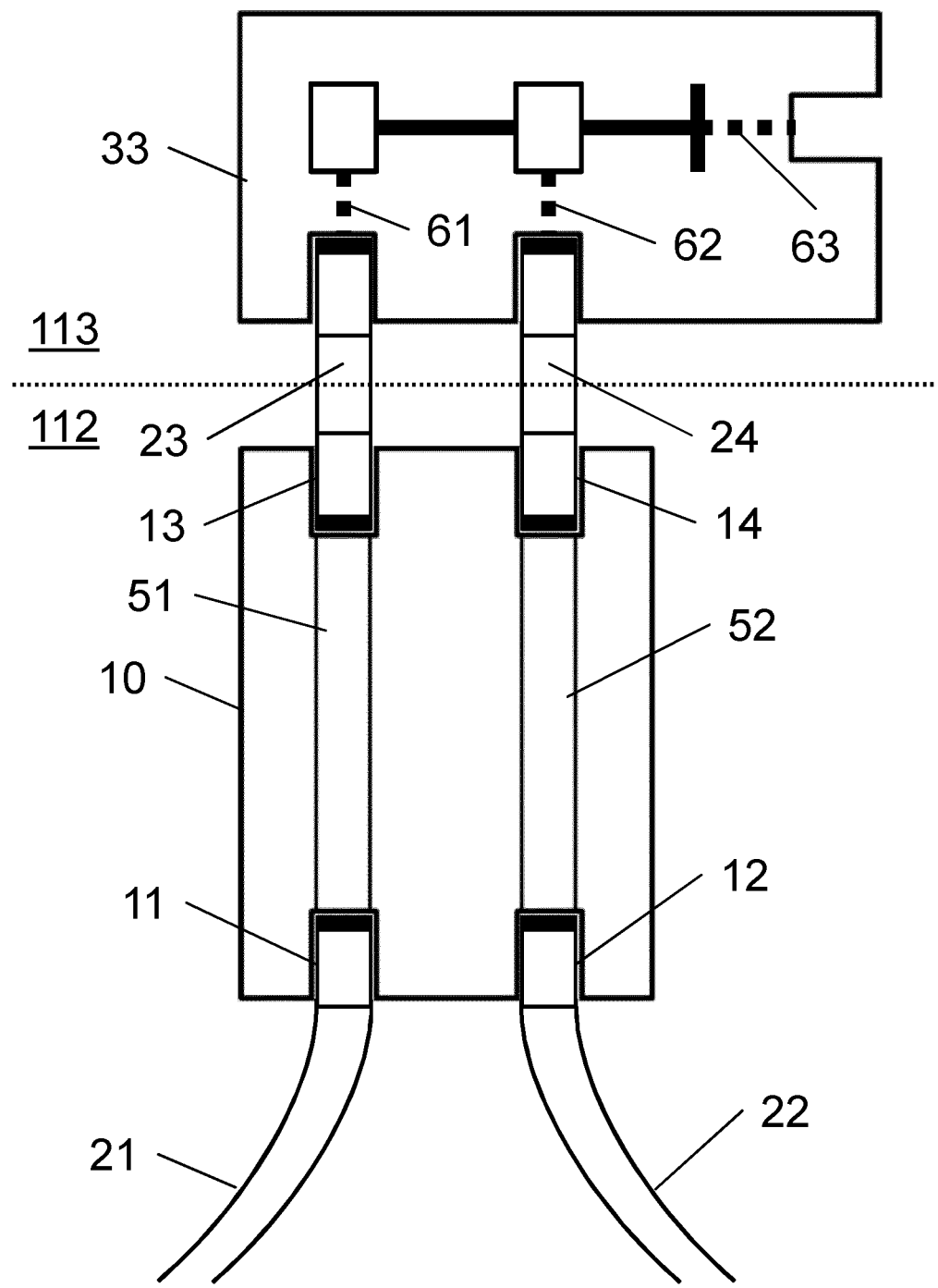
FIG. 5 schematically shows the high voltage joint of FIG. 4, when connected to the power grid and to a switchgear of the wind turbine.

FIG. 4 schematically shows an example of a high voltage joint 10 as used with the current invention. The high voltage joint 10 comprises a number of terminals 11, 12, 13, 14 to which different cables are to be connected. FIG. 5 schematically shows the high voltage joint 10 of FIG. 4, when connected to the power grid 20 and to a switchgear 33 of the wind turbine 100. As schematically indicated by the dotted line in the figure, the high voltage joint 10 is located in the support section 112 of the transition piece 140, while the switchgear 33 is installed in the tower piece 113.

A grid input terminal 11 is provided for receiving and connecting to a first array cable 21 coming from another wind turbine or from an offshore substation (OSS). This first array cable 21 connects the wind turbine 100 to the power grid 20 and can power equipment in the wind turbine 100 when not powered by, e.g., navigational aids and power output sockets. A grid output terminal 12 is provided for receiving and connecting to a second array cable 22 leading to a subsequent wind turbine. Via the first array cable 21, the generated power from the wind turbine 100 is delivered to the power grid 20.

A WTG connecting output terminal 13 and a WTG connecting input terminal 14 are provided for providing an easy connection the switchgear 33. An input cable 23 connects the WTG connecting output terminal 13 to an input of the switchgear 33 and an output cable 24 connects the WTG connecting input terminal 14 of the high voltage joint 10 to an output of the switchgear 33. The connectors of the input and output cables 23, 24 are preferably of the same type as commonly used for array cables 21, 22, such that the switchgear unit 33 can be a normal switchgear 33 as already known from and used in other wind turbines 100. The switchgear 33 may comprise three high voltage switches 61, 62, 63 for selectively connecting the input array cable 21, the output array cable 22 and a cable delivering the electric power generated by the wind turbine 100 to each other. The high voltage switches 61, 62, 63 may be controllable circuit breakers that can be switched between a connected and a disconnected status on demand. Alternatively, one or more of the circuit breakers may be substituted with simpler and cheaper disconnect switches.

The WTG connecting output terminal 13 of the high voltage joint 10 is operatively connected to grid input terminal 11 via a cable 51 or other type of conductive arrangement. Alternatively, the grid input terminal 11 and the WTG connecting output terminal 13 are arranged in such a way that the first array cable 21 and the input cable 23 make direct contact when inserted into their respective terminals 11, 13. A similar cable 52 or alternative connection arrangement is provided for connecting the WTG connecting input terminal 14 to the grid output terminal 12.

Figure 6:
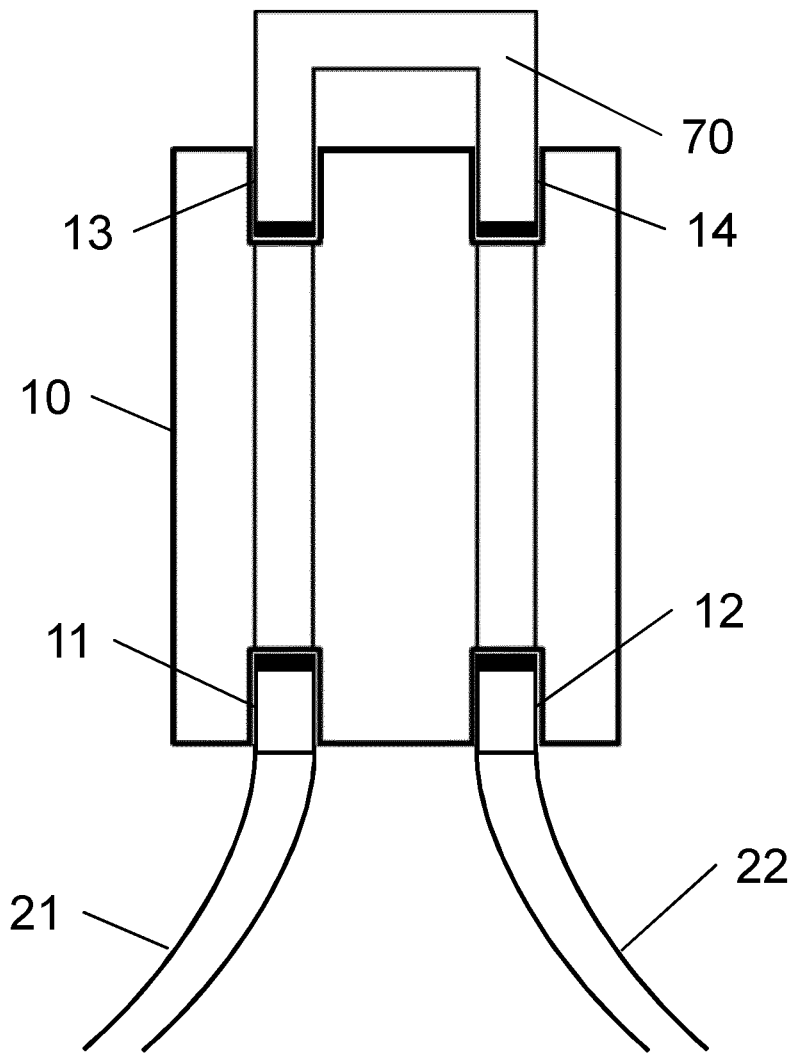
FIG. 6 schematically shows the high voltage joint of FIGS. 4 and 5, connected by a jumper.

FIG. 6 schematically shows the high voltage joint 10 of FIGS. 4 and 5, connected by a jumper 70. With the jumper 70 connected to the WTG connecting input and output terminals, 14, 13, a direct electrical connection between the incoming and the outgoing array cables 21, 22 is established. For example, when no tower piece 3 has been installed yet or when the wind turbine 100 is temporarily disconnected for maintenance operations, this high voltage joint 10 makes it possible to keep the other wind turbines on the same string 200 energized. Consequently, there is no need any more to first complete the construction of all the wind turbines on a string 200 before the first one can start delivering power to the grid 20 and electricity production can continue when only one or a few wind turbines are out for maintenance. Also, with the jumper 70 connected, the power grid structure and connections can already be tested as soon as the construction of the transition pieces 140 has been completed, i.e. before any tower piece 113 has arrived and when no switchgear 33 is present in any of the transition pieces 140.

Because no switchgear 33 is needed for connecting all the array cables 21, 22 in the power grid network, there is no need to already provide the switchgear 33 with the transition piece 140 and hence before the tower piece 113 and the nacelle 130 are delivered and installed. With the switchgear 33, and possibly also additional equipment (see the discussion of the content of FIG. 3), located in the tower piece 113 and not in the transition piece 140, space is made available inside the tower piece support section 112 of the transition piece 140 to accommodate the stairway 31.

Figure 7:
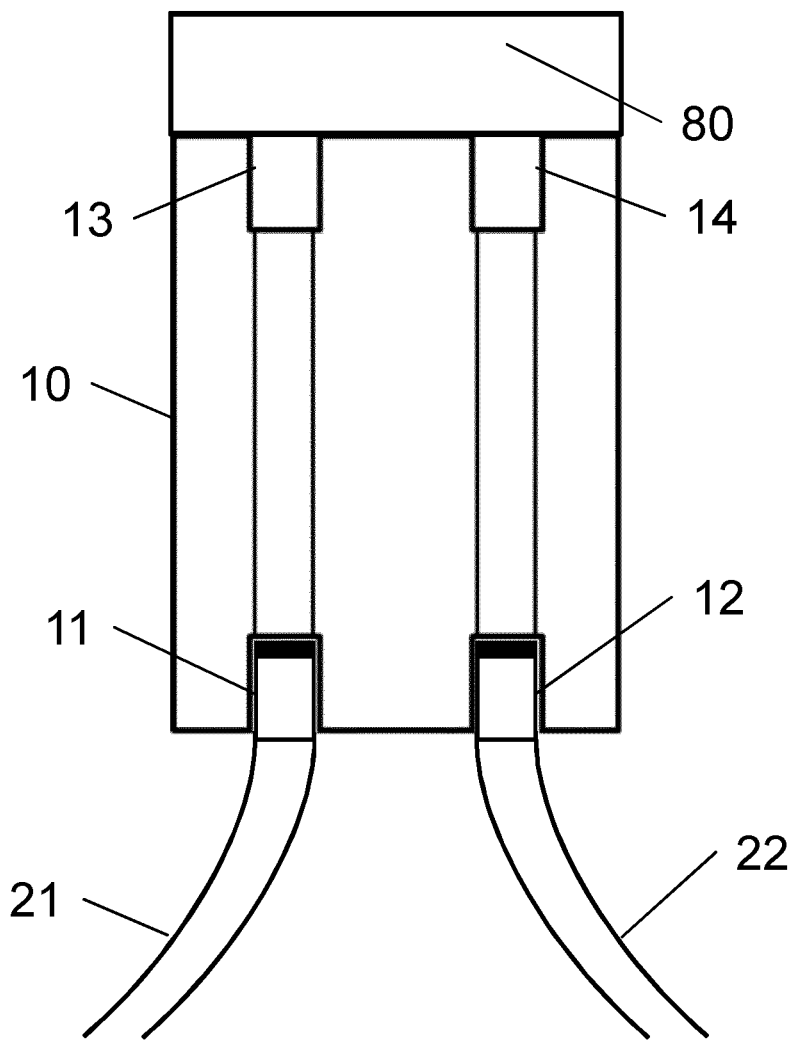
FIGS. 7 and 8 schematically show the high voltage joint of FIGS. 4 and 5, covered by a protective cover.
Figure 8:
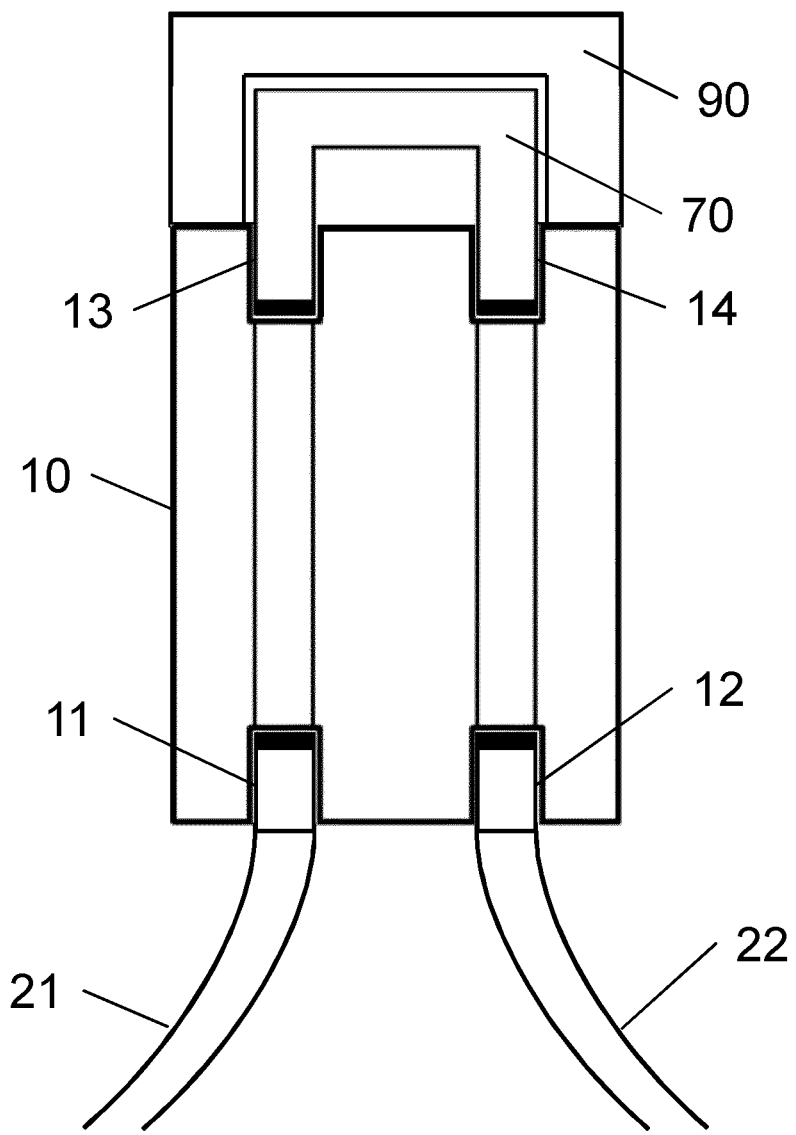

FIG. 7 schematically shows the high voltage joint 10 of FIGS. 4 and 5, covered by a protective cover 80. The protective cover 80 may shield of the WTG connecting input and output terminals 14, 13 when the high voltage joint 10 is not connected to the switchgear 33 and no jumper 70 is installed. The protective cover 80 may be made of any kind of electrically insulating material. With the protective cover 80 applied the risk of a person involuntarily touching the WTG connecting input or output terminal 14, 13 or these terminals being damaged due to ongoing construction work is eliminated. FIG. 8 schematically shows the high voltage joint 10 of FIGS. 4 and 5, covered by a different design of protective cover 90 that can also be used when the jumper 70 is connected to the WTG connecting input or output terminal 14, 13. This cover 90 covers both the jumper 70 and the WTG connecting input and output terminal 14, 13. Also this protective cover 90 is useful for both safety and protection against damage.

Figure 9:
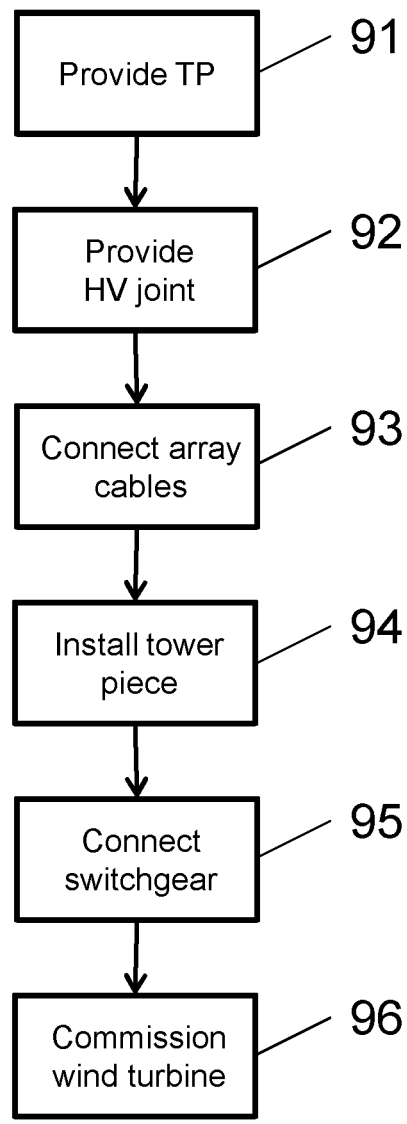
FIG. 9 is a flow chart of a method of installing a wind turbine.

FIG. 9 is a flow chart of a method of installing a wind turbine 100. The method includes a step 91 of installing a transition piece 140 (TP) as described above on top of a tower foundation 111. At this stage, the transition piece 140 does preferably not contain any expensive and sensitive equipment that could be damaged during the construction process. According to the invention, it is enough if during or after the construction of the transition piece 140, a high voltage (HV) joint 10 is installed in the transition piece 140 (step 92). Before, during and/or after installation, the high voltage joint 10 may be covered by a protective cover 80, 90 as shown in FIGS. 7 and 8. After installation of the high voltage 10 joint, the first and second array cables 21, 22 are respectively connected to the grid input terminal 11 and the grid output terminal 12 in step 93.

A jumper 70 may then be used for connecting the WTG connecting output terminal 13 to the WTG connecting input terminal 14. The jumper 70 temporarily couples the two array cables 21, 22 in order to, e.g., allow for string testing or operation of already completed wind turbines on the same string 200, before and during installation of the WTG that is installed at the respective transition piece 140. If a jumper 70 is used at this stage, it will have to be removed later, before the HV joint 10 is connected to the switchgear 33 (step 95).

The tower piece 113 is installed on top of the transition piece 140 in step 94. The tower piece 113 may comprises multiple tower sections. At this stage, also the nacelle 130 and the rotor can be installed. Alternatively, the nacelle 130 is provided separately and installed later. Blades 120 are typically installed separately and one by one. The switchgear 33 is typically provided together with the tower piece 113. In step 95, the switchgear 33 is connected to the HV joint 10 by connecting an output cable 23 between the WTG connecting output terminal 13 of the HV joint 10 and a high voltage input terminal of the switchgear 33, and an input cable 24 between a high voltage output terminal of the switchgear 33 and the WTG connecting input terminal 14 of the HV joint 10. If the first array cable 21 is energized before the switchgear 33 is connected, this cable should be de-energized first. After successfully connecting the switchgear 33 to the HV joint 10, and if the whole wind turbine 100 has been completed, the wind turbine 100 can be commissioned and may start delivering electric power to the power grid 20 in step 96.

Figure 10:
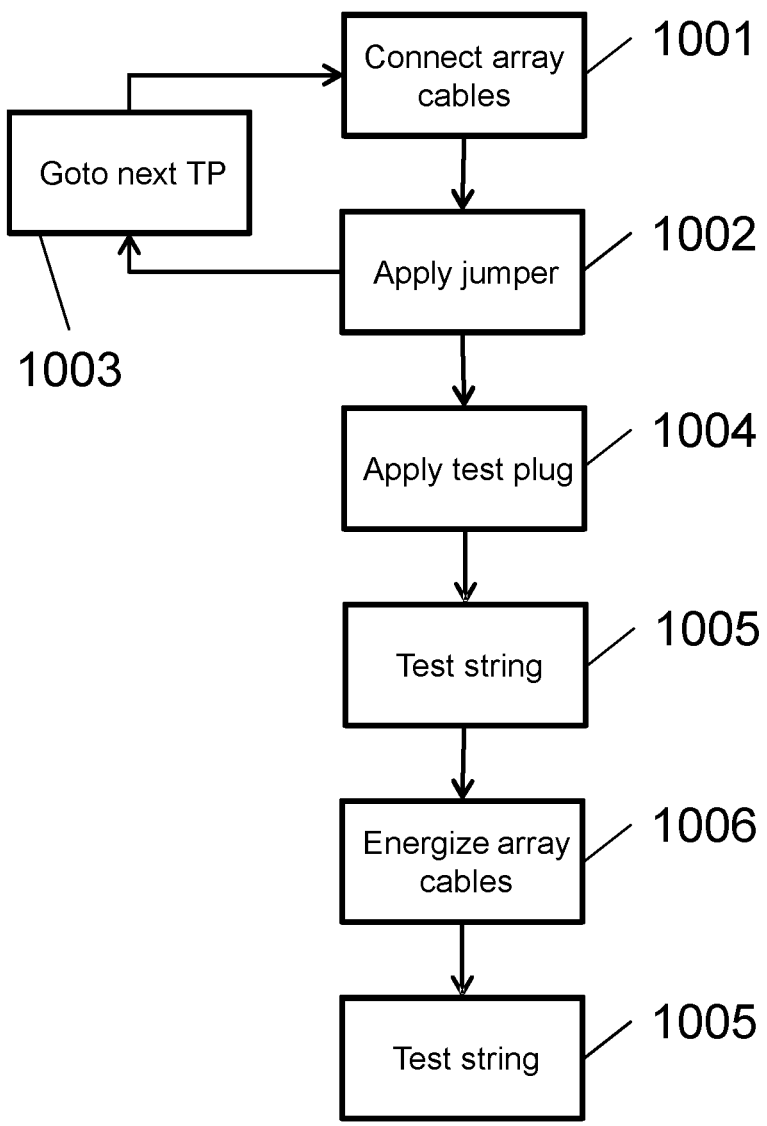
FIG. 10 is a flow chart of a method of testing a power grid for connecting a plurality of wind turbines.

FIG. 10 is a flow chart of a method of testing a power grid for connecting a plurality of wind turbines. When an offshore wind park is built, first the tower foundations 111 and transition pieces 140 of all the wind turbines are typically installed. According to the invention, the transition pieces comprise a high voltage joint 10 as described above. Possibly, the first tower pieces 113, nacelles 130 and rotors 125 are already shipped to their offshore location and installed, while the construction of all transition pieces has not yet been completed. In the time period that all transition pieces have been installed, all array cables 21, 22 making up the offshore section of the power grid 20 are provided, but not all wind turbines have been built yet, there may be a need to already test the power grid 20 in order to find out if all the array cables 21, 22 will eventually be connected as planned. This testing without any (or all) wind turbines and their switchgears 33 present is made possible because of the high voltage joints 10 that are installed in the transition pieces.

According to the invention, a method of testing the power grid 20 is provided comprising a first step 1001 of connecting the first and second array cables 21, 22 to the grid input terminal 11 and the grid output terminal 12 of a high voltage joint 10 of one of the transition pieces 140. Subsequently (step 1002), a jumper 70 may then be used for connecting the WTG connecting output terminal 13 to the WTG connecting input terminal 14. The jumper 70 thereby establishes an electrical connection between the two array cables 21, 22 without requiring the presence of a switchgear 33 or a full WTG. If there are further transition pieces 140 on the same string 200 that need to be connected to the power grid 20 too, the same two steps (array cable connection 1001 and jumper installation 1002) are repeated at the high voltage joints 10 of the other transition pieces 140. When all transition pieces 140 on the string 200 are connected to the power grid, a test plug may be connected (step 1004) to the WTG connecting output terminal 13 of the high voltage joint 10 of the last transition piece on the string 200. However, other methods of testing may not require the use of a test plug. Then, optionally, the string 200 is tested (step 1005) before energizing (step 1006) the first array cable 21 leading from the OSS 150 to the first transition piece 140 on the string 200. When everything is ok, the test will prove the string 200 to be dead during the first optional test and all high voltage joints will proof to be connected and powered during the second test.

Figure 11:
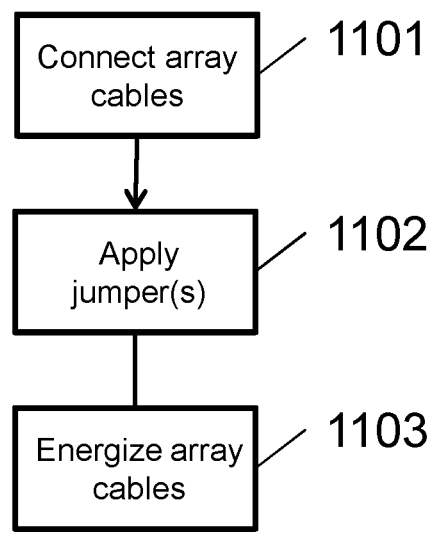
FIG. 11 is a flow chart of a method of connecting at least two wind turbines to the same power grid.

FIG. 11 is a flow chart of a method of connecting at least two wind turbines 100 to the same power grid 20. This connection method makes use of the HV joint 10 described above and is used to connect two wind turbines that are separated by at least one intermediate wind turbine or transition piece with such a HV joint 10. In a first step 1101, a first array cable 21 is connected between the grid output terminal 12 of the HV joint 10 of the first one of the two to be connected wind turbines and the grid input terminal 11 of the HV joint 10 of the intermediate transition piece 140. A second array cable 22 is connected between the grid output terminal 12 of the HV joint 10 of that intermediate transition piece 140 and the grid input terminal 12 of the HV joint 10 of the second one of the two to be connected wind turbines. If there are more than one intermediate transition pieces, the second array cable 22 is connected to the grid input terminal 11 of the HV joint 10 of the next transition piece 140 and only the last intermediate transition piece 140 is directly coupled to the second wind turbine. In step 1102, a jumper 70 is installed between the to the WTG connecting input and output terminals 13, 14 of the HV joints 10 of each intermediate transition piece 140. This step 1102 may be performed either before, during or after the connection of the array cables. With all the array cables and jumpers being correctly connected to the intermediate transition portions 140, the two wind turbines 100 are electrically connected, without requiring a switchgear 33 to be present or connected in any of the intermediate transition pieces 140.

After connecting the two wind turbines, the array cables can be energized (step 1103) and the wind turbines operated. When later a wind turbine is installed on top of one of the intermediate transition pieces, the array cables can be de-energized, and the switchgear of the new wind turbine connected to the HV joint of the intermediate transition piece.

Figure 12:
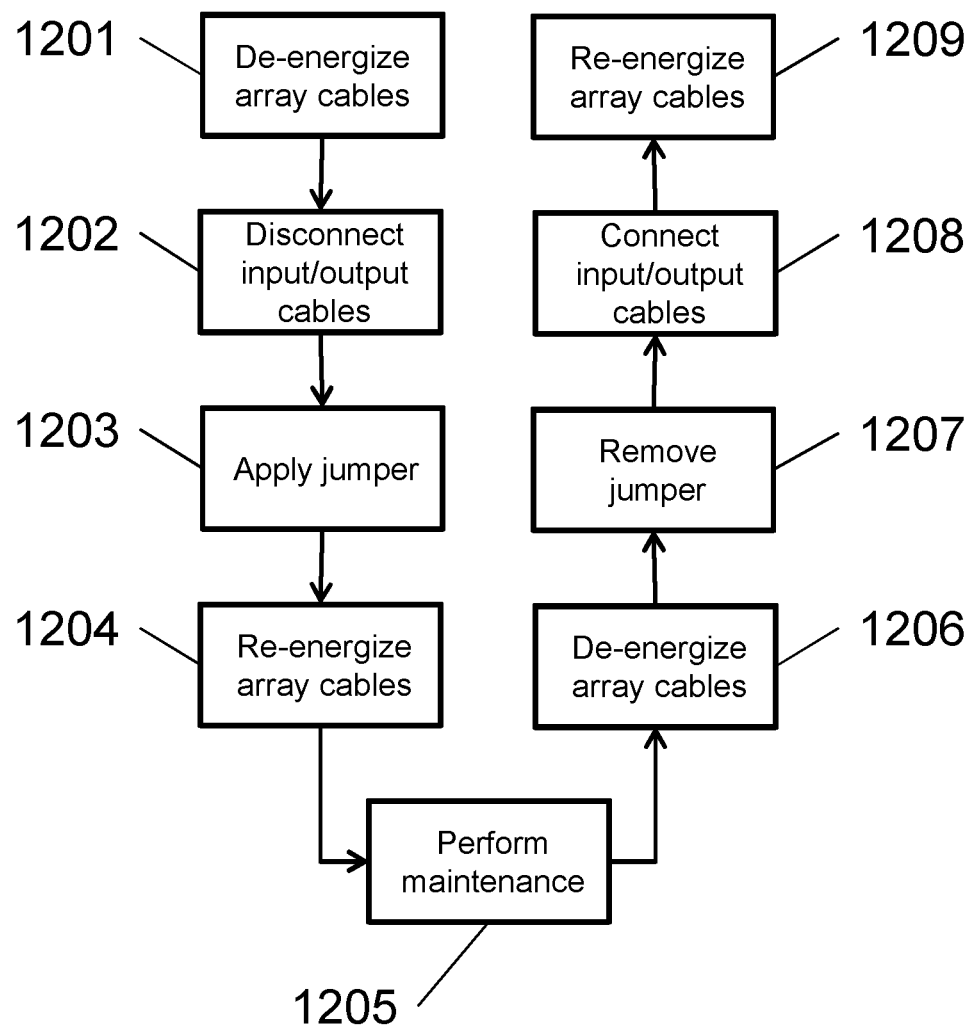
FIG. 12 is a flow chart of a maintenance method for a wind turbine.

FIG. 12 is a flow chart of a maintenance method for a wind turbine 100. The at least one wind turbine 100 comprises a transition piece 140 and high voltage joint 33 as described above. The method comprises de-energizing (step 1201) the first array cable 21 to the high voltage joint 10, disconnecting (step 1202) the output cable 23 and the input cable 24 from, respectively, the WTG connecting output terminal 12 and the WTG connecting input terminal 14 of the high voltage joint 10 and applying a jumper 70 (step 1203) to the WTG connecting output terminal 13 and the WTG connecting input terminal 14 and thereby establishing an electrical connection therebetween. In a next step 1204, the first array cable is re-energized, thereby allowing the other wind turbines on the same string 200 to resume operation.

With the switchgear 33 of this specific wind turbine 100 disconnected, it is possible to perform at least one maintenance operation at this wind turbine 100. The maintenance operation may, e.g., include a (partial) removal or replacement of the switchgear 33, a powertrain component or a nacelle and/or tower piece. During the maintenance operation the jumper 70 and part of the high voltage joint 10 may be covered by a cover 90 as shown in FIG. 8. When the maintenance operation is completed and the wind turbine 100 is ready to be used again, the first array cable 21 is de-energized, the jumper 70 is removed and the output and input cables 23, 24 are reconnected to the appropriate terminals of the switchgear and the high voltage joint 10. Then the first array cable 21 is re-energized and the wind turbine 100 is ready for use again.

Many modifications may be made to the specific examples described above without departing from the scope of the invention as defined in the accompanying claims.

The invention claimed is:

1. A transition piece for a wind turbine tower, the transition piece being configured to be installed on a tower foundation and to carry a tower piece, the transition piece comprising a high voltage joint, the high voltage joint comprising:
   a grid input terminal for receiving and connecting to an array cable from a power grid,
   a WTG connecting output terminal, operatively connected to the grid input terminal, for receiving and connecting to an input cable leading to a switchgear,
   a WTG connecting input terminal for receiving and connecting to an output cable from the switchgear, and
   a grid output terminal, operatively connected to the WTG connecting input terminal, for receiving and connecting to an array cable leading to the power grid.

2. The transition piece as claimed in claim 1, wherein the high voltage joint further comprises a detachable jumper, connecting the WTG connecting output terminal to the WTG connecting input terminal.

3. The transition piece as claimed in claim 1, wherein the transition piece is free of a switchgear.

4. The transition piece as claimed in claim 1, further comprising a platform with a tower piece support section, the tower piece support section comprising a wall with a doorway connecting an inside of the tower piece support section with an outside of the tower piece support section, the high voltage joint being provided inside the tower piece support section.

5. The transition piece as claimed in claim 4, further comprising a stairway, provided inside the tower piece support section, for allowing a person to climb from a platform level to a first level of the tower piece, when the tower piece is installed on the tower piece support section.

6. A wind turbine tower comprising a tower foundation, a transition piece as claimed in claim 1, and a tower piece, wherein the transition piece is provided on the tower foundation and the tower piece is installed on top of the transition piece.

7. The wind turbine tower as claimed in claim 6, wherein the tower piece comprises one or more lower sections with electronic equipment for electrically connecting a wind turbine generator to a power grid and wherein the electronic equipment comprises at least one of a transformer, a switchgear and a tower controller.

8. The wind turbine tower as claimed in claim 6, wherein at least one of the lower sections of the tower piece comprises a bottom part of a lift system.

9. The wind turbine tower as claimed in claim 8, wherein the at least one of the lower sections comprising the bottom part of the lift system has an outer wall that is free of doorways.

10. The wind turbine comprising a wind turbine tower as claimed in claim 6 and a nacelle with a rotor.

11. A method of installing a wind turbine, the method comprising:
 installing a transition piece according to claim 1 on a tower foundation,
 then connecting a first array cable from a power grid to the grid input terminal of the high voltage joint, and
 connecting a second array cable leading to the power grid to the grid output terminal of the high voltage joint,
 then, installing a tower piece on top of the transition piece, and
 thereafter connecting an output cable between the WTG connecting output terminal of the high voltage joint and a high voltage input terminal of a switchgear, and
 connecting an input cable between a high voltage output terminal of the switchgear and the WTG connecting input terminal of the high voltage joint.

12. The method of installing a wind turbine according to claim 11, wherein the switchgear is provided together with the tower piece.

13. The method of installing a wind turbine according to claim 12, further comprising energizing the first array cable after connecting of the output cable between the WTG connecting output terminal of the high voltage joint and the high voltage input terminal of the switchgear.

14. The method of installing a wind turbine according to claim 13, further comprising energizing the second array cable after connecting of the input cable between the high voltage output terminal of the switchgear and the WTG connecting input terminal of the high voltage joint.

15. The method of installing a wind turbine according to claim 11, the method further comprising:
 before connecting the output cable and the input cable between the high voltage joint and the switchgear, applying a jumper to the WTG connecting output terminal and the WTG connecting input terminal of the high voltage joint and thereby establishing an electrical connection therebetween,
 keeping the jumper attached during a subsequent phase of the installation process, and
 at the end of said subsequent phase, removing the jumper and
 thereafter connecting the output cable and the input cable between the high voltage joint and the switchgear.

16. The method of installing a wind turbine according to claim 15, further comprising, during said subsequent phase of the installation process, testing the power grid.

17. The method of installing a wind turbine according to claim 15, further comprising, during said subsequent phase of the installation process, operating a wind turbine connected to the first and/or second array cable.

18. The method of installing a wind turbine according to claim 11, further comprising covering the WTG connecting output terminal and/or the WTG connecting input terminal of the high voltage joint by a protective cover during at least some of the period before connecting the output cable and the input cable between the high voltage joint and the switchgear.

19. A method of testing a power grid for connecting a plurality of wind turbines, at least one of the wind turbines comprising a transition piece as claimed in claim 1, the method comprising:
 connecting a first array cable from the power grid to the grid input terminal of the high voltage joint of said transition piece,
 connecting a second array cable, leading to the power grid, to the grid output terminal of the high voltage joint,
 applying a jumper to the WTG connecting output terminal and the WTG connecting input terminal of the high voltage joint and thereby establishing an electrical connection therebetween, and
 testing the power grid.

20. The method of testing a power grid as claimed in claim 19, wherein at least a second one of the wind turbines comprises a transition piece, the method further comprising attaching a test plug to the WTG connecting output terminal of the high voltage joint of the second one of the wind turbines.

21. A method of connecting at least two wind turbines to the same power grid, the power grid comprising at least one transition piece as claimed in claim 1, the at least one transition piece not being part of any of the at least two wind turbines, the method comprising:
 connecting a first array cable, from a first one of the at least two wind turbines, to the grid input terminal of the high voltage joint of said transition piece,
 connecting a second array cable, leading to a second one of the at least two wind turbines, to the grid output terminal of the high voltage joint, and
 applying a jumper to the WTG connecting output terminal and the WTG connecting input terminal of the high voltage joint and thereby establishing an electrical connection therebetween.

22. The method of connecting at least two wind turbines to the same power grid as claimed in claim 21, wherein the step of applying the jumper is performed before connecting the first and the second array cables.

23. The method of connecting at least two wind turbines to the same power grid as claimed in claim 21, further comprising energizing the first and the second array cables and starting operation of the first one and the second one of the at least two wind turbines.

24. The method of connecting at least two wind turbines to the same power grid as claimed in claim 22, further comprising de-energizing the first array cable, removing the jumper from the WTG connecting output terminal and the WTG connecting input terminal of the high voltage joint, connecting an output cable between the WTG connecting output terminal of the high voltage joint and a high voltage input of a switchgear of a wind turbine generator comprising the at least one transition piece, connecting an input cable between a high voltage output of the switchgear and the WTG connecting input terminal of the high voltage joint, re-energizing the first array cable.

25. A maintenance method for at least one wind turbine in a network of multiple wind turbines, the at least one wind turbine comprising a transition piece as claimed in claim 1, the method comprising:

de-energizing the first array cable to the high voltage joint of the transition piece of the at least one wind turbine, disconnecting the output cable and the input cable from, respectively, the WTG connecting output terminal and the WTG connecting input terminal of said high voltage joint, applying a jumper to the WTG connecting output terminal and the WTG connecting input terminal and thereby establishing an electrical connection therebetween, re-energizing the first array cable, performing at least one maintenance operation at the at least one wind turbine, de-energizing the first array cable, removing the jumper from the WTG connecting output terminal and the WTG connecting input terminal, connecting an output cable between the WTG connecting output terminal of the high voltage joint and the high voltage input of the switchgear, connecting an input cable between the high voltage output of the switchgear and the WTG connecting input terminal of the high voltage joint, re-energizing the first array cable.

26. The maintenance method for at least one wind turbine as claimed in claim 25, wherein the at least one maintenance operation includes at least a partial removal or replacement of the switchgear.

* * * * *